No. 625,992. Patented May 30, 1899.
E. A. UEHLING.
APPARATUS FOR TREATING SLAG.
(Application filed Oct. 26, 1897.)
(No Model.) 3 Sheets—Sheet 3.
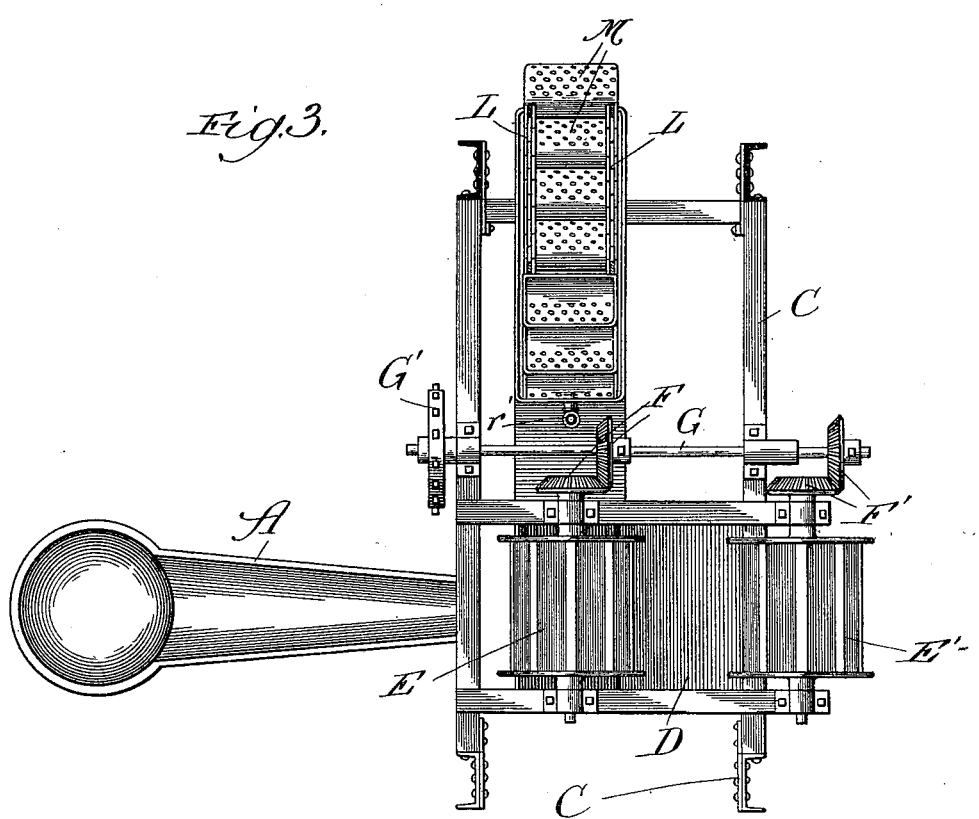

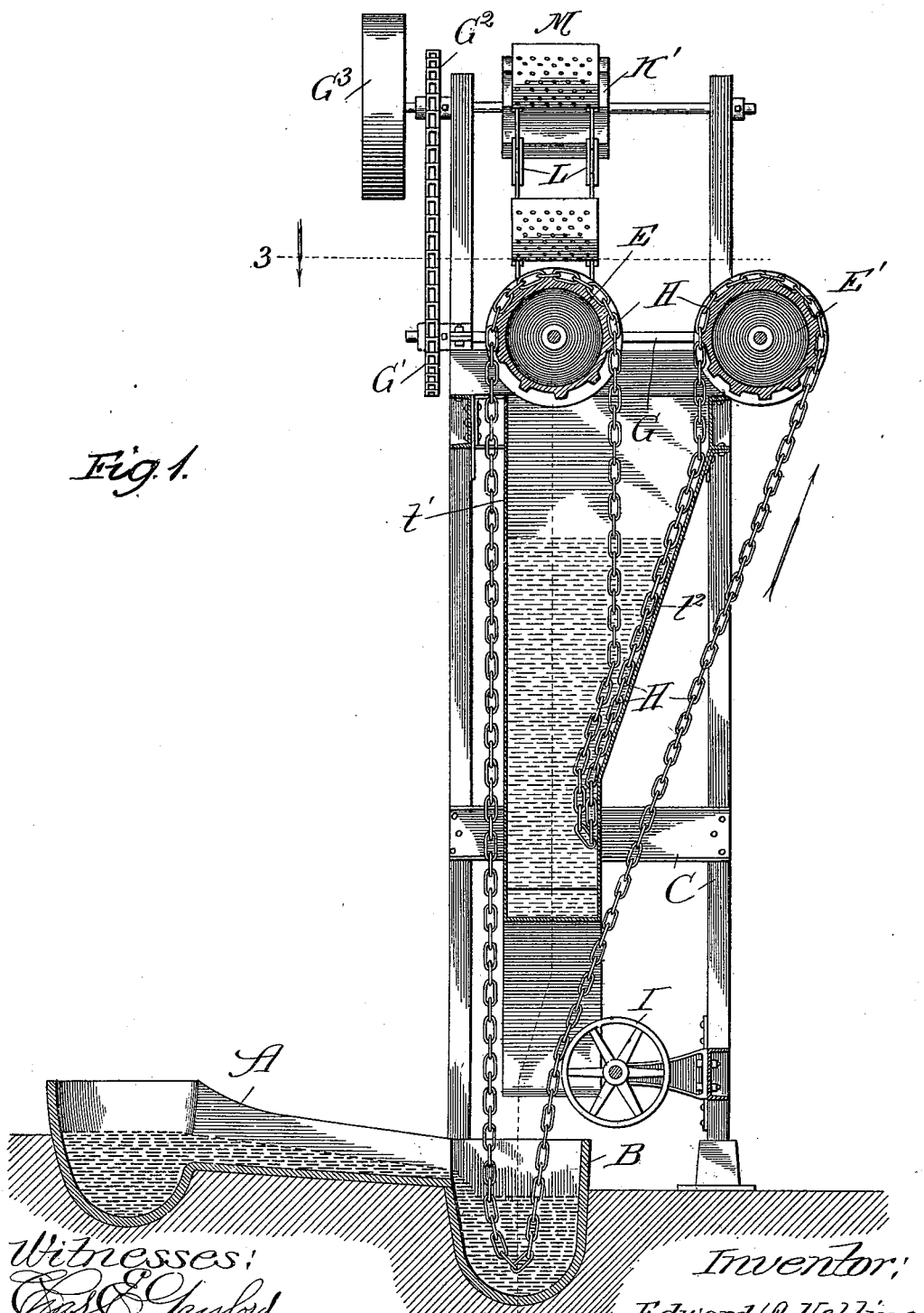

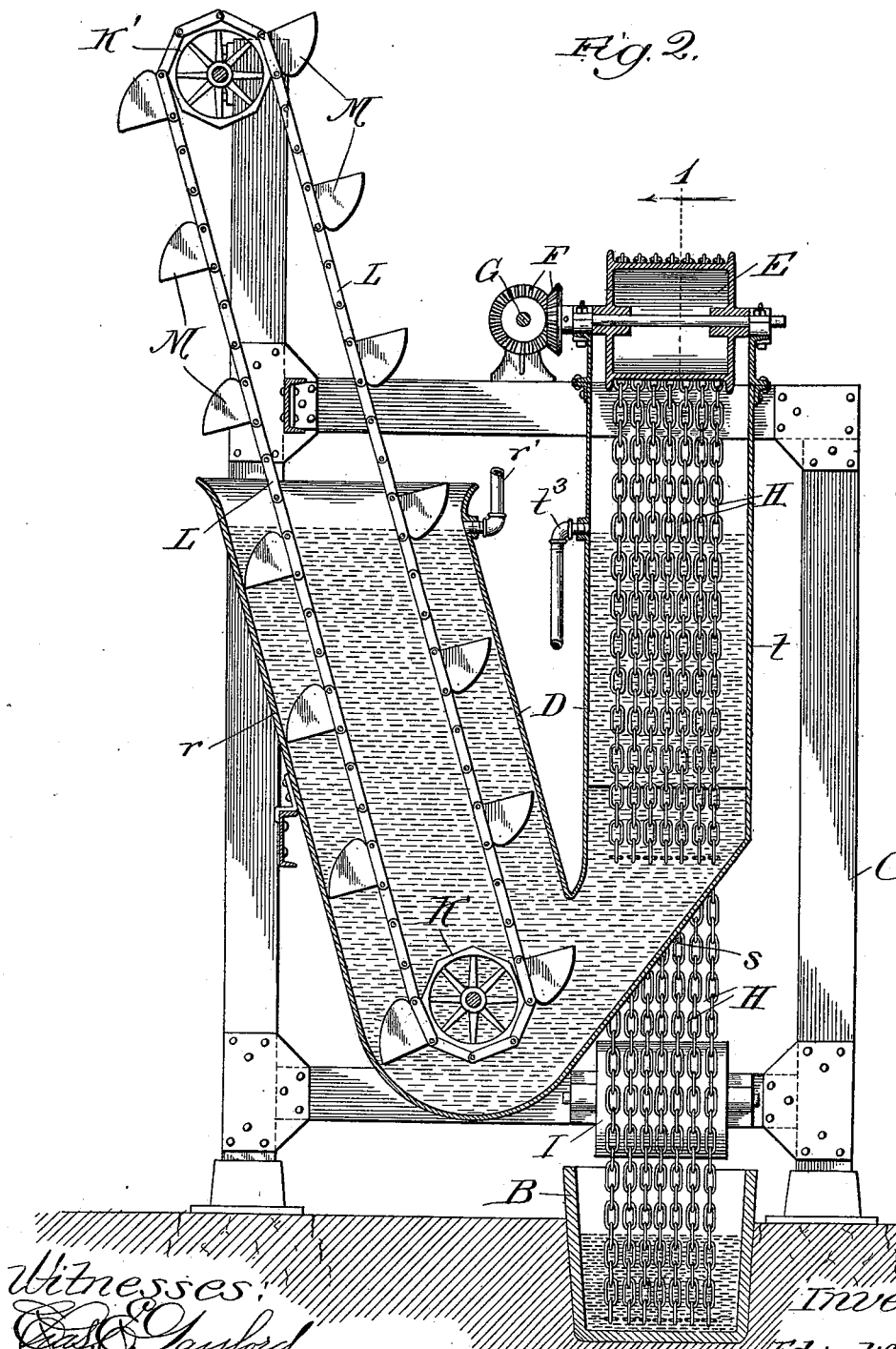

UNITED STATES PATENT OFFICE.

EDWARD A. UEHLING, OF NEWARK, NEW JERSEY.

APPARATUS FOR TREATING SLAG.

SPECIFICATION forming part of Letters Patent No. 625,992, dated May 30, 1899.

Application filed October 26, 1897. Serial No. 656,459. (No model.)

*To all whom it may concern:*

Be it known that I, EDWARD A. UEHLING, a citizen of the United States, residing at Newark, in the county of Essex and State of New Jersey, have invented a new and useful Improvement in Treating Slag, of which the following is a specification.

My invention relates to the treatment of furnace-slag for the purpose of producing a commercially-valuable disintegrated material therefrom. The commercial desirability of furnace-slag if disintegrated into particles of various degrees of coarseness and of a sufficient density is recognized and explained in my concurrently-pending application for Letters Patent, filed September 10, 1897, Serial No. 651,211, in which application I describe and claim a method and apparatus eminently desirable for the purposes therein stated. In that invention I utilize the operation of suddenly chilling the liquid slag, and in the present invention I utilize also the physical effect of this sudden chilling. The mode of utilizing this action, as well as the apparatus therefor, is under my present invention, however, materially different from that previously contrived.

The object of my invention is to accomplish the treatment of slag economically and rapidly, whereby the entire output of slag may be taken care of, and to produce by this operation a disintegrated mass of densified particles capable of use in certain arts.

My invention consists in an apparatus for the treatment of slag composed, essentially, of a conveyer, preferably metallic and preferably also in the form of a chain, which, by reason of the connection with the driving mechanism and its relation to the slag-containing vessel, well, or trough, is caused to dip into the liquid slag, which thereby adheres to the metallic conveyer, the conveyer carrying the adherent slag to a water trough or well or to some other means for suddenly cooling the liquid slag, whereby the slag disintegrates and falls from the conveyer. In connection with the apparatus thus generally described are means for removing the disintegrating slag for the purpose of shipment.

My invention consists, further, in the general and specific details of construction and combinations of parts, all as hereinafter more fully set forth.

In the drawings, Figure 1 is a view in side sectional elevation of the apparatus for treating slag embodying my preferred construction, viewed on line 1 of Fig. 2; Fig. 2, a front sectional view of the same on the line 2 of Fig. 1, and Fig. 3 a sectional plan view taken on the line 3 of Fig. 1, all views being in the direction of the arrows.

A represents a slag-trough into which the slag is received from the furnace or from any other means of supply and from which the slag flows in a liquid condition to the well B. An upright frame C, suitably constructed with vertical and cross pieces to afford a suitable means of supporting the operating parts of the mechanism, is located contiguous to the well B. The details of construction of this frame are simple and need not be enlarged upon. Supported within the frame C is the disintegrating-tank D, which, by preference, is of the peculiar shape shown— that is to say, it comprises the three sections or members $t\ s\ r$, which have free communication with each other. Of these members of the tank the first, $t$, is generally vertical in its arrangement, with three straight sides $t'$ and one upwardly and outwardly inclined side $t^2$. This section also, by preference, is supplied with an overflow-pipe $t^3$. The section $s$ is smaller in its transverse dimensions than the section $t$ and inclines downwardly from the section $t$. The third section $r$ has the width in one transverse measurement of the section $s$, while in the other transverse measurement it is somewhat greater in width. The section $r$ is supplied toward its upper end with a water-admitting pipe $r'$. It will be understood that the division of the tank into sections is made solely for the purpose of explanation of the parts. In practice they all constitute a single tank made, preferably, of sheet metal. It will also be understood that the exact shape illustrated is not essential.

Mounted upon the frame C, in an elevated position, are the toothed or ribbed drums E E'. Each of the drums E E' is connected, as by the beveled gears F F', with a suitable shaft G, carrying at its end a sprocket G', driven by a chain connection with the sprocket G² and pulley G³, and thereby driving the drums E E' in unison. An endless chain H passes over each drum E E', and by reason of the engagement of the teeth or ribs on the drums with the links of the chain it is caused to move in endless rotation into and out of the slag-well B over the lower guide-pulley I and into and out of the section $t$ of the disintegrating-tank D. The chain H, as stated, is endless and of a length to cause it to dip well down into the section $t$ of the tank D.

Toward the bottom of the section $r$ of the tank D is a wheel K, while at the upper end of the frame C is a corresponding wheel K', supported on a shaft having at its outer end the sprocket G³. Extending from the wheel K' to the wheel K is an endless chain L, carrying the rigid buckets M, each of which is perforated in its outer wall, as indicated in Figs. 1 and 3. This endless chain L with the buckets M constitute the conveyer for the disintegrated slag, while the chain H constitutes the conveyer for the molten slag.

In practice, while it is possible to utilize economically a single chain H, I prefer to employ a considerable number of endless chains arranged and moving side by side, as thereby without material increase in the size or cost of the apparatus a much greater capacity is afforded.

The operation will be readily understood. Power from any suitable source is applied to the drive-pulley G³, which transmits motion to the bucket conveyer L M as well as to the chain or set of chains H. The well B receiving molten slag through the trough A or in any other convenient manner, the chain H dips into the well and the slag adheres thereto. The adhesion of the slag to the chain continues until the molten slag comes into contact with the cold water in the tank D, when it immediately disintegrates and falls off the chain into the bottom of the section $r$ of the tank D. It will be observed upon an examination of Fig. 1 that the chain in entering the tank does so in an inclined direction, while the line of its vertical withdrawal from the tank is such that one part of the chain will brush against another part. This action serves to complete the removal of the particles of disintegrated slag from the chain conveyer. The disintegrated material deposited in the bottom of the tank D is scooped up by the buckets M, from which the water readily falls through the perforations, and upon the reversal of the bucket its contents are expelled to be received in any suitable device for conveying it away from the apparatus. A constant stream of cold water passes through the tank, and the quantity admitted will necessarily be regulated according to the degree to which the chilling action is to be carried.

I do not of course confine myself to the use of water in this connection, although I esteem its use to be the most desirable for obvious reasons. Neither do I limit myself to the employment of a chain composed of links, although this is preferred, partly because of the facility it offers for conveying motion thereto through the medium of drums and partly because of the large metallic surface which it offers for the adherence thereto of molten slag. The action of the slag upon the iron is one to cause the destruction of the latter, but the cheapness of chains, coupled with the fact that the association of the metal thereof with the slag in no sense impairs the latter, but rather improves it, causes this element of expense to become of little consequence. It will be manifest that the well B as such is not essential, as it is quite feasible to utilize the slag-ladle in common use at furnaces or to use any other convenient slag-receptacle to supply the purpose of the well B.

In its broader scope my invention is not limited to the specific chilling means nor to the use of the bucket conveyer shown and described, as any available means for suddenly cooling the adherent slag and any suitable means for removing the disintegrated slag which the surrounding circumstances may render desirable can be employed in place of that shown.

What I claim as new, and desire to secure by Letters Patent, is—

1. In an apparatus for the treatment of slag the combination with the receptacle for molten slag of a moving slag-conveyer made of material to which the liquid slag will adhere, and a chilling device to receive the moving conveyer carrying the slag whereby the slag becomes disintegrated, said conveyer passing through the receptacle and chilling device, substantially as described.

2. In an apparatus for treating slag for the purpose specified, the combination with the slag-containing vessel and with a vessel containing a chilling agent, of a moving metallic conveyer arranged with relation to the said vessel whereby it in the course of its movement first dips into the slag-containing vessel to receive the liquid slag by adherence, and then into the chilling vessel to cause the disintegration and removal of the slag, substantially as described.

3. In an apparatus for treating slag for the purpose specified, the combination of a liquid-slag containing vessel, a tank containing a slag-chilling agent, and a flexible metallic conveyer offering a surface for the adhesion thereto of liquid slag, said conveyer being movable through the vessel to receive the liquid slag, and thence to the chilling-tank to effect the disintegration and removal of the slag, substantially as described.

4. In an apparatus for treating slag for the purpose specified, the combination with a liquid-slag receiving vessel and with a chilling-tank, of an endless metallic conveyer supported to move into and out of the slag vessel and into and out of the chilling-tank, as and for the purpose described.

5. In an apparatus for treating slag for the purpose specified, the combination with a liquid-slag receiving vessel and with a chilling-tank, of an endless metallic conveyer movable through the vessel and thence to the chilling-tank, and a conveyer for the disintegrated slag adapted to convey the disintegrated slag from the chilling-tank, substantially as described.

6. In an apparatus for treating slag for the purpose specified, the combination with a liquid-slag receiving vessel and with a metallic conveyer adapted to dip into the slag-containing vessel and remove the slag therefrom, of a tank containing a chilling agent arranged in the path of the conveyer to bring said agent and liquid slag into contact to effect the sudden chilling of the latter, substantially as described.

7. In an apparatus for treating slag for the purpose set forth, the combination with a liquid-slag containing vessel and with a metallic conveyer supported and arranged to dip into the slag vessel in its movement whereby the slag is caused to adhere to the surface of the conveyer, of a tank containing water, the parts being arranged substantially as described whereby the moving conveyer after taking up the slag shall enter the water in the tank thereby suddenly chilling the slag and effecting its disintegration, all as set forth.

8. In an apparatus for treating slag for the purpose specified, the combination with a liquid-slag containing vessel, and with a tank containing a chilling agent, of a movable chain constituting the liquid-slag conveyer and arranged and supported substantially as described whereby it shall first dip into the liquid-slag vessel and then into the chilling vessel, substantially as described.

9. In an apparatus for treating liquid slag for the purpose set forth, the combination with the liquid-slag containing vessel and with a chilling-tank of an endless chain, driving-drums engaging said chain and causing the same to move continuously, and a disintegrated-slag conveyer operating in the chilling-tank, the parts being arranged substantially as described whereby the chain in its movement is caused first to dip into the liquid slag, and then to pass through the chilling-tank, and the disintegrated slag is removed, substantially as set forth.

10. In an apparatus for treating slag for the purpose specified, the combination with the liquid-slag containing vessel, chilling-tank containing a chilling liquid, the chain-driving drums, and the disintegrated-slag conveyer, of a number of chains each made endless and of a length whereby part of it will enter the vessel and part of it will enter the tank, each of said chains being supported by the drums to cause it first to dip into the liquid slag and then to dip into the chilling liquid, substantially as described.

11. The apparatus for treating slag for the purpose specified comprising, in combination, the well B, the chilling-tank containing a chilling liquid, chain-driving mechanism such as the drums E, E', and the endless chain H one or more in number, and having the length whereby part of it will dip into the well and part of it will dip into the tank, substantially as described.

12. The apparatus for the treatment of slag comprising, in combination, the well B, the tank D, the chain supporting and moving drums, the endless chain H passed around the drums and dipping into the well and into the tank, and the endless conveyer L, M, in relation to the tank to convey therefrom the disintegrated slag, substantially as described.

13. The apparatus for the treatment of slag, comprising, in combination, the slag-containing vessel, the endless chain, liquid-slag conveyer, passing through said vessel, the supporting-drums for operating said conveyer, the tank D provided with means for admitting thereto a chilling liquid, and the disintegrated-slag conveyer operating upon the slag deposited in the tank D, all as set forth.

14. The apparatus for the treatment of slag, comprising, in combination, the well B, the supporting-frame C, the tank D having the vertical and the inclined members $t$, $r$, connected as described, the drums E, E', and means for rotating them in unison, the endless chain supported on and moved by said drums, and of a length whereby part of it shall dip into the slag-well and part of it shall dip into the tank D, and the endless conveyer L having perforated buckets, and arranged with relation to the tank D to remove the disintegrated slag therefrom, all as set forth.

EDWARD A. UEHLING.

Witnesses:
JAS. W. MILLER,
ERNST TROCHARKA.